United States Patent
Hoeger

(10) Patent No.: US 12,304,016 B2
(45) Date of Patent: May 20, 2025

(54) GAS SURGE PREVENTION USING IMPROVED FLOW REGULATORS IN WELDING-TYPE SYSTEMS

(71) Applicant: ILLINOIS TOOL WORKS INC., Glenview, IL (US)

(72) Inventor: Michael Vincent Hoeger, Appleton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 18/422,683

(22) Filed: Jan. 25, 2024

(65) Prior Publication Data

US 2024/0157462 A1    May 16, 2024

Related U.S. Application Data

(63) Continuation of application No. 17/155,882, filed on Jan. 22, 2021, now Pat. No. 11,938,574.

(51) Int. Cl.
*B23K 9/32*    (2006.01)
*B23K 9/095*    (2006.01)
*B23K 9/16*    (2006.01)

(52) U.S. Cl.
CPC ............ *B23K 9/325* (2013.01); *B23K 9/0953* (2013.01); *B23K 9/164* (2013.01)

(58) Field of Classification Search
CPC . B23K 3/08; B23K 3/02; B23K 9/095; B23K 9/164; B23K 37/00
See application file for complete search history.

(56) References Cited

U.S. PATENT DOCUMENTS

| | | | |
|---|---|---|---|
| 3,791,813 | A | 2/1974 | Ramachandran |
| 4,749,841 | A | 6/1988 | Galantino |
| 4,871,898 | A | 10/1989 | Cherne |

(Continued)

FOREIGN PATENT DOCUMENTS

| | | |
|---|---|---|
| AU | 2018100195 | 3/2018 |
| CN | 1200060 | 11/1998 |

(Continued)

OTHER PUBLICATIONS

Machine Translation of Takemure et al (WO 2013/051178), performed on Aug. 5, 2024 (Year: 2013).*

(Continued)

*Primary Examiner* — Brian W Jennison
(74) *Attorney, Agent, or Firm* — McAndrews, Held & Malloy, Ltd.

(57) ABSTRACT

Systems and apparatus are disclosed relating to improved fluid supply systems. In some examples, the improved fluid supply systems use an electrically controllable proportional valve and a surge prevention process to prevent a surge of pressurized fluid at the end of a welding-type operation. In particular, the surge prevention process may coordinate closure of the proportional valve and an on/off solenoid valve so that pressure in the fluid flow path can equalize to an ambient pressure after a welding operation (and/or a post flow operation) has ended. This coordination ensures that there is no pressure buildup and/or associated surge of fluid when the on/off solenoid valve is next opened (e.g., at the start of the next welding operation).

20 Claims, 5 Drawing Sheets

(56) References Cited

U.S. PATENT DOCUMENTS

| | | | |
|---|---|---|---|
| 5,291,423 | A | 3/1994 | Roeoesli |
| 6,178,997 | B1 | 1/2001 | Adams |
| 6,479,793 | B1 | 11/2002 | Wittmann |
| 7,552,731 | B2 | 6/2009 | Jorczak |
| 8,129,652 | B2 | 3/2012 | Hampton |
| 8,651,137 | B2 | 2/2014 | Keffer |
| 8,754,348 | B2 | 6/2014 | Salsich |
| 9,690,304 | B2 | 6/2017 | Downie |
| 10,672,967 | B2 | 6/2020 | Denis |
| 2003/0213520 | A1 | 11/2003 | Prinz |
| 2005/0039804 | A1 | 2/2005 | Kim |
| 2005/0127043 | A1 | 6/2005 | Albrecht |
| 2007/0051703 | A1 | 3/2007 | Neff |
| 2007/0289950 | A1 | 12/2007 | Eyton |
| 2008/0053965 | A1 | 3/2008 | Laymon |
| 2009/0107960 | A1 | 4/2009 | Hampton |
| 2009/0152251 | A1 | 6/2009 | Dantinne |
| 2009/0302007 | A1 | 12/2009 | Richard |
| 2010/0276398 | A1 | 11/2010 | Halvorsen |
| 2011/0073569 | A1 | 3/2011 | Rappl |
| 2012/0248081 | A1 | 10/2012 | Hutchison |
| 2012/0255988 | A1 | 10/2012 | Perry |
| 2013/0112660 | A1 | 5/2013 | Enyedy |
| 2014/0097165 | A1 | 4/2014 | Leisner |
| 2014/0374396 | A1 | 12/2014 | Luo et al. |
| 2015/0027998 | A1 | 1/2015 | Brine et al. |
| 2016/0001391 | A1 | 1/2016 | Nacey |
| 2016/0059341 | A1 | 3/2016 | Peters |
| 2016/0136764 | A1 | 5/2016 | Enyedy |
| 2016/0221107 | A1 | 8/2016 | Kadlec |
| 2016/0263691 | A1 | 9/2016 | Smith |
| 2017/0165775 | A1 | 6/2017 | Knoener |
| 2017/0216954 | A1 | 8/2017 | Blankman |
| 2018/0031152 | A1 | 2/2018 | Rajagopalan |
| 2018/0043456 | A1 | 2/2018 | Hoeger |
| 2018/0290229 | A1* | 10/2018 | Wada ............... F17C 13/00 |
| 2019/0302811 | A1 | 10/2019 | Bragg |

FOREIGN PATENT DOCUMENTS

| | | |
|---|---|---|
| CN | 101214584 | 7/2008 |
| CN | 101850458 | 10/2010 |
| CN | 111098000 | 5/2020 |
| EP | 0331062 | 9/1989 |
| EP | 0854006 | 7/1998 |
| JP | S63240930 | 10/1988 |
| JP | 01186281 | 7/1989 |
| JP | H01186281 | 7/1989 |
| JP | 2005177822 | 7/2005 |
| JP | 2019051546 | 4/2019 |
| TW | 200920537 | 5/2009 |
| WO | 2006123069 | 11/2006 |
| WO | 2013051178 | 4/2013 |
| WO | 2015047770 | 4/2015 |
| WO | 2019170289 | 9/2019 |
| WO | 2019170289 A1 | 9/2019 |

OTHER PUBLICATIONS

"Welding Handbook, Chapter 4—Gas Metal Arc Welding ED", O'Brien, Jan. 1, 2004, Welding Handbook Processes, vol. 2, Welding Processes, Part 1, American Welding Society, p. 178, right hand column, paragraphs 1-2.

Binzel-Abicor, EWR 2 / EWR 2 Net Gas Monitoring System, retreived from https://www.binzel-abicor.com/US/eng/products/robotic-systems/gas-management-system-ewr-2-ewr-2-net/, retreived on Jan. 19, 2021, 13 pages.

Brooks Instruments, Mass Flow Controllers & Meters: Mass flow control technology. Unsurpassed process precision, retrieved from https://www.brooksinstrument.com/en/products/mass-flow-controllers, retrieved on Jan. 19, 2021, 6 pages.

Bush, Steve; "Smart IoT valve allows remote gas cylinder management," Electronics Weekly.com., Jan. 18, 2018, 3 pages.

Environics, Series 3000 Gas Blending-Gas Delivery System, https://www.environics.com/products/gas-blending-gas-delivery-systems/, 5 pages, retrieved Jan. 5, 2021.

European Patent Office, Extended European Search Report, Application No. 21159544.2, dated Aug. 16, 2021, 6 pages.

Extended European Search Report for European Patent Application No. 22152645.2, mailed Jul. 29, 2022, 10 pages.

Extended European Search Report, appln No. 22151249.4, mailed Jun. 20, 2022, 9 pages.

International Search Report and Written Opinion for PCT/US2017/046700, dated Nov. 22, 2017, 20 pages.

Miller Electric Manufacturing Company, Spectrum 1250MG, Jun. 2000, 48 pages.

Pietro Fiorentini S.p.a.; "Smart Gas Grids—FIO2 Gas Pressure Regulator Smart add-on" 2015, retrieved on Feb. 26, 2020, 6 pages.

Pietro Fiorentini S.p.a.; "FIO 2.2 Smart add-on for gas pressure Regulators," 2015, retrieved on Feb. 26, 2020, 12 pages.

Siemens World Wide; "SITRANS P280" Siemens Industry Mall, https://maill.undustry.siemens.com/mall/en/WW/Catalog/Products/10069488, retrieved Feb. 18, 2020, 1 page.

SuperFlash, Fully customize and mix your gases!, https://oxyfuelsafety.com/fully-customize-and-mix-your-gases, Mar. 18, 2015, 7 pages.

European Patent Office, Office Action, Application No. 21159544.2, mailed Mar. 28, 2023, 5 pages.

European Patent Office, Office Action, Application No. 22151249.4 dated Jun. 12, 2023, 8 pages.

Canada Patent Office, Office Action, Application No. 3,143,816, dated Nov. 22, 2023, 4 pages.

European Patent Office, Office Action, Application No. 22151249.4 dated Jan. 18, 2024, 5 pages.

European Patent Office, Office Action, Application No. 22152645.2, mailed Aug. 27, 2024, 5 pages.

* cited by examiner

GAS SURGE PREVENTION USING IMPROVED FLOW REGULATORS IN WELDING-TYPE SYSTEMS

CROSS REFERENCE TO RELATED APPLICATIONS

This application is a continuation of, and claims priority to, co-pending U.S. patent application Ser. No. 17/155,882, filed Jan. 22, 2021, entitled "Gas Surge Prevention Using Improved Flow Regulators in Welding-Type Systems," the entire contents of which are hereby incorporated by reference.

TECHNICAL FIELD

This disclosure relates to welding-type systems and, more particularly, to gas surge prevention using improved flow regulators in welding-type systems.

BACKGROUND

Some welding-type systems use compressed air and/or shielding gas to protect (or shield) against impurities that can be caused by elements in the atmosphere. Flow regulators are used to regulate a flow rate of compressed air and/or shielding gas in the welding-type system. Conventional flow regulators must be manually adjusted by hand to control air/gas flow rates from the air/gas bottle to the welding-type operation.

SUMMARY

Gas surge prevention using improved flow regulators in welding-type systems, substantially as illustrated by and described in connection with at least one of the figures, as set forth more completely in the claims.

These and other advantages, aspects, and/or novel features of the present disclosure, as well as details of an illustrated example thereof, will be more fully understood from the following description and drawings.

DRAWINGS

Features, aspects, and/or advantages of the present disclosure will become better understood when the following detailed description is read with reference to the accompanying drawings in which like characters represent like parts throughout the drawings, wherein.

Figure 1:
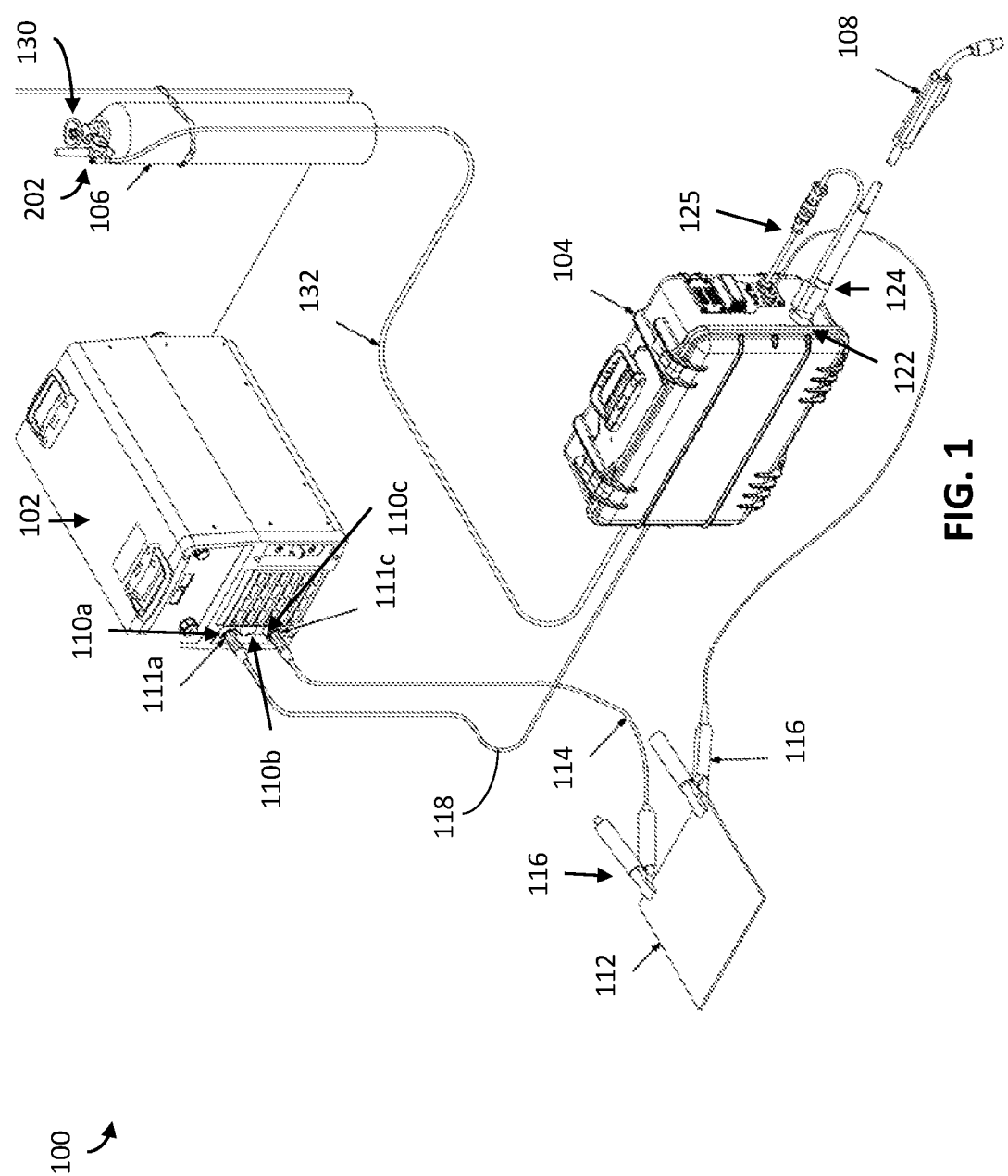
FIG. 1 shows an example of a welding-type system, in accordance with aspects of this disclosure.

The figures are not necessarily to scale. Where appropriate, similar or identical reference numbers are used to refer to similar or identical components. For example, reference numerals utilizing lettering (e.g., pressure gauge 214*a*, pressure gauge 214*b*) refer to instances of the same reference numeral that does not have the lettering (e.g., pressure gauges 214).

DETAILED DESCRIPTION

Welding-type systems that use fluid (e.g., shielding gas and/or compressed air) sometimes route the fluid through an on/off solenoid valve in a welding-type power supply, wire feeder, or welding tool (e.g., welding torch). When a welding-type operation (e.g., welding, cutting, etc.) begins, the on/off solenoid valve is opened to allow fluid to flow from a fluid supply tank. When the welding-type operation ends (or after a post flow operation ends), the valve is closed. However, because fluid is still trying to flow from the fluid supply tank when the valve is closed, there may be a sudden surge of pressurized fluid when the valve is next opened, which can have a negative impact on the next welding-type operation.

Example improved fluid supply systems disclosed herein include a proportional valve upstream from the on/off solenoid valve, as well as a surge prevention process. The proportional valve may be electrically controlled, unlike the manual hand adjusted flow control valves in conventional systems. The surge prevention process controls the proportional valve and the on/off solenoid valve so that the proportional valve closes before the on/off valve at the end of a welding operation. After closing the proportional valve, the fluid flow path between the two valves may be allowed to equalize to an ambient pressure before the on/off valve is closed. Thus, there is no pressure buildup when the on/off valve is closed, nor a sudden surge of pressurized fluid when the on/off valve is next opened.

Some examples of the present disclosure relate to a welding-type system, comprising a first valve in fluid communication with a fluid reservoir; a second valve in fluid communication with the first valve and a welding tool; and control circuitry configured to: in response to detecting an end of a weld, or an end of a postflow operation following the end of the weld: close the first valve via a first control signal, and close the second valve via a second control signal after a pressure in a flow path between the first valve and the second valve has equalized to an ambient environment pressure.

In some examples, the flow path comprises a third flow path, and the first valve has a first flow path and a first plunger configured to adjustably restrict the first flow path via a plurality of steady state plunger positions. In some examples, the second valve has a second flow path and a second plunger configured to open or close the second flow path. In some examples, the first valve is a proportional valve.

In some examples, the second valve is an on or off solenoid valve. In some examples, the second valve is in a welding-type power supply, a wire feeder, or the welding tool. In some examples, the control circuitry is configured to wait a first time period after closing the first valve before closing the second valve in order to provide time for the pressure in the flow path between the first valve and the second valve to equalize to the ambient environment pressure.

In some examples, the system further comprises an energy harvester configured to harvest electrical energy from fluid flowing from the fluid reservoir, the electrical energy used to power the first valve. In some examples, the system further comprises a scale configured to detect a weight of the fluid reservoir, the control circuitry being further configured to generate a notification or disable a piece of welding-type equipment via a third control signal in response to the weight falling below a threshold weight. In some examples, the system further comprises a flow meter configured to measure a fluid flow through the first valve or the second valve, the control circuitry being further configured to monitor a fluid count based on the fluid flow measured by the flow meter, and generate a notification in response to the fluid count being outside of a threshold range.

Some examples of the present disclosure relate to a method, comprising: in response to detecting an end of a weld or an end of a postflow operation following the end of the weld: closing a first valve via a first control signal sent by control circuitry, the first valve being in fluid communication with a fluid reservoir; and closing a second valve via a second control signal sent by the control circuitry after a pressure in a flow path between the first valve and the second valve has equalized to an ambient environment pressure, the second valve being in fluid communication with the first valve and a welding tool.

In some examples, the flow path comprises a third flow path, and the first valve has a first flow path and a first plunger configured to adjustably restrict the first flow path via a plurality of steady state plunger positions. In some examples, the second valve has a second flow path and a second plunger configured to open or close the second flow path. In some examples, the first valve is a proportional valve.

In some examples, the second valve is an on or off solenoid valve. In some examples, the second valve is in a welding-type power supply, a wire feeder, or the welding tool. In some examples, the method further comprises waiting a first time period after closing the first valve before closing the second valve in order to provide time for the pressure in the flow path between the first valve and the second valve to equalize to the ambient environment pressure.

In some examples, the method further comprises harvesting electrical energy from fluid flowing from the fluid reservoir via an energy harvester; and using the electrical energy to power the first valve. In some examples, the method further comprises detecting a weight of the fluid reservoir via a scale; and generating a notification or disabling a piece of welding-type equipment via a third control signal sent by the control circuitry in response to the weight falling below a threshold weight. In some examples, the method further comprises measuring a fluid flow through the first valve or the second valve via a flow meter; monitoring a fluid count, via the control circuitry, based on the fluid flow measured by the flow meter; and generating a notification, via the control circuitry, in response to the fluid count being outside of a threshold range FIG. 1 shows an example of a welding-type system 100, such as may be used to conduct welding-type operations (e.g., welding, cutting, brazing, etc.). In some examples, the example welding-type system 100 shown in FIG. 1 may be used to conduct gas metal arc welding (GMAW) processes. In some examples, the welding-type system 100 may also be used to conduct other arc welding processes (e.g., flux-cored arc welding (FCAW), gas shielded flux-cored arc welding (FCAW-G), gas tungsten arc welding (GTAW), submerged arc welding (SAW), shielded metal arc welding (SMAW), or similar arc welding processes). In some examples, the welding-type system 100 may be used with metal fabrication systems, such as plasma cutting systems, induction heating systems, and so forth.

In the example of FIG. 1, the welding-type system 100 includes a welding-type power supply 102 (a.k.a., a welding-type power source), a wire feeder 104, a fluid tank 106, and a welding-type tool 108 (e.g., welding torch). In some examples, the welding-type power supply 102 generally supplies welding-type power for the various welding-type components and/or accessories of the welding-type system 100 (e.g., the welding wire feeder 104 and/or welding-type tool 108) through connections of one or more plugs 111 with one or more sockets 110 of the power supply 102. In the example of FIG. 1, the welding-type power supply 102 is coupled to the welding wire feeder 104 through one plug 111a and socket 110a connection, and coupled to a work clamp 116 through another plug 111c and socket 110c connection. The plug 111c is coupled to one or more lead cables 114 that lead to the workpiece 112 through the work clamp 116, while the plug 111a is connected to one or more weld cables 118 which lead to the wire feeder 104. In the example of FIG. 1, the fluid tank 106 is coupled to the welding-type tool 108 through the wire feeder 104 via a fluid hose 132.

In the example of FIG. 1, the wire feeder 104 includes a socket 122 connected to a cable 124 of the welding-type tool 108 that is plugged into the socket 122. In some examples, welding-type power from the welding-type power supply 102 and/or fluid from the fluid tank 106 may be delivered to the welding-type tool 108 through the connection of the cable 124 and socket 122. In some examples, filler material (e.g., wire) from the wire feeder 104 may also be supplied to the welding-type tool 108 via connection of the cable 124 and the socket 122. In the example of FIG. 1, a trigger plug 125 of the welding-type tool 108 is also connected to the wire feeder 104. Via the trigger plug 125 connection, signals from activation/deactivation of the welding-type tool 108 (e.g., via trigger pull/release) may be communicated.

In some examples, the welding-type power supply 102 may instead directly couple to the cable 124 and/or trigger plug 125 of the welding-type tool 108, such that power, filler material, fluid, and/or trigger signals may be directly transmitted through the socket 110 of the power supply 102. In such an example, the fluid tank 106 may instead be coupled to the welding-type power supply 102 via hose 132, rather than the wire feeder 104, and/or the wire feeder 104 may be part of the welding-type power supply 102. In some examples, an operator may activate the tool 108 to initiate an arc (and/or other welding-type operation) between the tool 108 and the workpiece 112. While the welding-type tool 108 is depicted as a welding torch in the example of FIG. 1, in some examples, the tool 108 may be some other welding-type tool.

In the example of FIG. 1, a conventional fluid regulator 202 is coupled to the fluid tank 106. In some examples, the fluid tank 106 may be a tank of compressed air, shielding gas, or some other type and/or source of fluid (e.g., bottle, cylinder, etc.). In the example of FIG. 1, the fluid tank 106 includes a hand wheel 130 configured to open and/or close a globe valve of the fluid tank 106 when turned.

Figure 2:
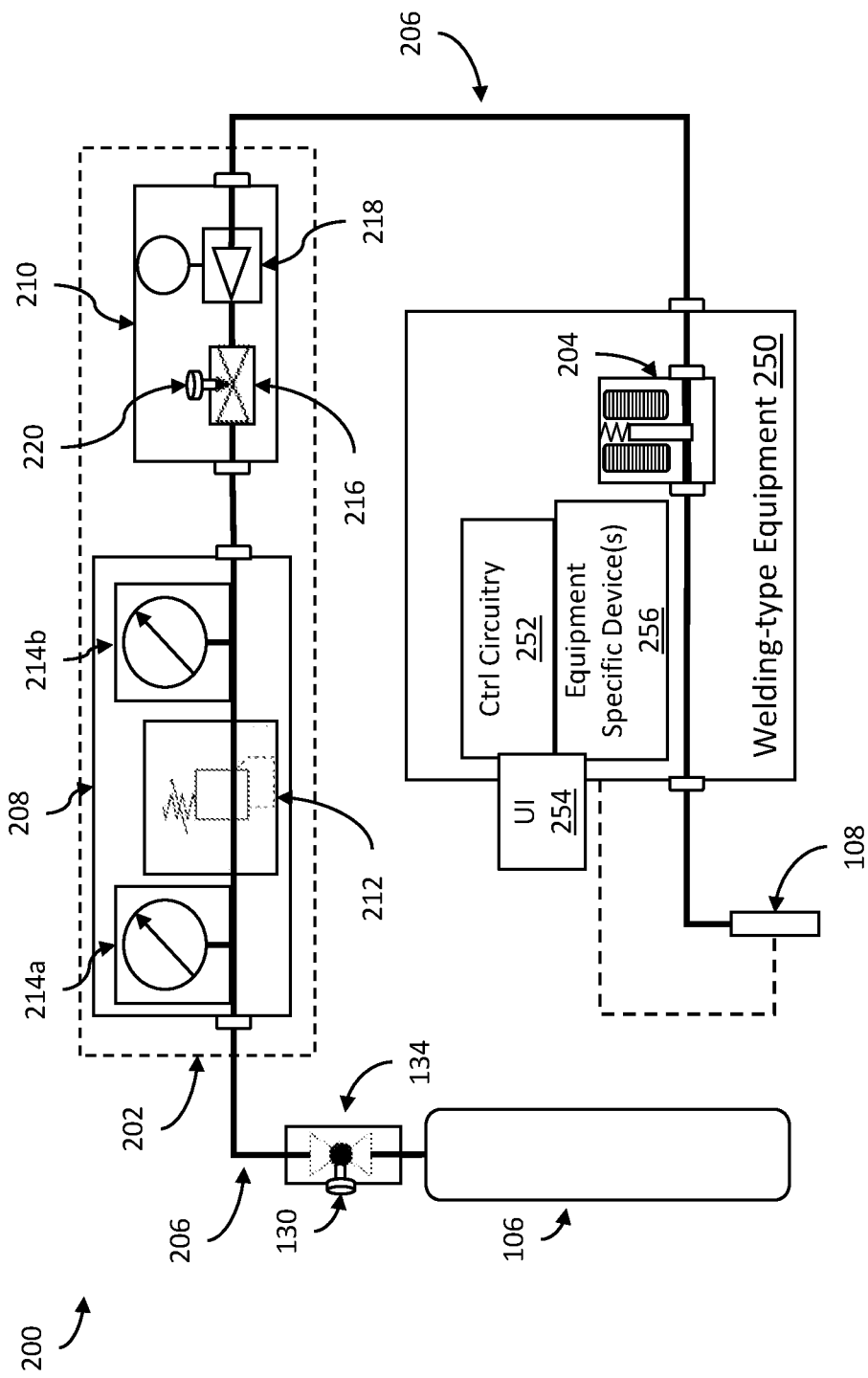
FIG. 2 is a diagram of an example fluid supply system that may be used with the welding-type system of FIG. 1, in accordance with aspects of this disclosure.

FIG. 2 is a diagram showing an example fluid supply system 200 that may be used with the welding-type system 100 of FIG. 1. As shown, the fluid supply system 200 includes a fluid tank 106, a fluid regulator 202, an on/off solenoid valve 204, and the welding-type tool 108 in fluid communication with one another via fluid path 206. In some examples, the fluid path 206 may be made up of one or more pipes, tubes, conduits, cables (e.g., cable 124), hoses (e.g., hose 132), and/or other fluid communication means.

In the example of FIG. 2, the fluid tank 106 includes a globe valve 134 with a hand wheel 130 that is configured to open and/or close the globe valve 134 when turned. When the globe valve 134 is closed, the globe valve 134 prohibits fluid from flowing from the fluid tank 106. When the globe valve 134 is opened, fluid may flow from the fluid tank 106 into the fluid path 206 of the fluid supply system 200.

In the example of FIG. 2, the fluid regulator 200 is downstream from the globe valve 134, and upstream from the on/off solenoid valve 204 and welding tool 108. As used herein, upstream refers to a position in the fluid path 206 closer to the fluid tank 108, while downstream refers to a position in the fluid path closer to the welding-type tool 108. As shown, the fluid regulator 202 includes a pressure regulator 208 and a flow regulator 210.

In the example of FIG. 2, the pressure regulator 208 includes a pressure valve 212, a first pressure gauge 214a, and a second pressure gauge 214b (though, in some examples, the pressure regulator 208 may include only one pressure gauge 214). In some examples, the pressure valve 212 is a mechanical device that reduces the pressure of the fluid flowing from the fluid tank 106 to a lower pressure that is more manageable for the fluid supply system 200. In the example of FIG. 2, the first pressure gauge 214a of the pressure regulator 208 is in fluid communication with, and configured to measure the fluid pressure in, the fluid path 206 on the upstream side of the of pressure valve 212. The second pressure gauge 214b is in fluid communication with, and configure to measure the fluid pressure in, the fluid path 206 on the downstream side of the pressure valve 212.

In the example of FIG. 2, the flow regulator 210 is downstream of the pressure regulator 208, and includes a needle valve 216 and a ball float flow meter 218. The needle valve 216 includes a hand adjustable knob 220 configured to adjust the size of a valve opening in the needle valve 216 in response to movement (e.g., turning) of the knob 220 (e.g., via the hand of an operator). In some examples, changing the size of the valve opening of the needle valve 216 changes a flow rate of fluid through the needle valve 216. In some examples, the ball float flow meter 218 measures the flow rate of fluid through the fluid path 206 downstream (or, in some examples, upstream) of the needle valve 216. A ball that moves up in down in a marked tube of the ball float flow meter 218 can be read by a nearby operator to determine the fluid flow rate measured by the ball float flow meter 218. In some examples, other mechanical flow meters may be used instead of the ball float flow meter 218.

In the example of FIG. 2, the on/off solenoid valve 204 is downstream of the flow regulator 210 in a piece of welding-type equipment 250 (e.g., the welding-type power supply 102 and/or the wire feeder 104). In some examples, the on/off solenoid valve 204 may instead be proximate and/or part of the welding-type tool 108. As shown, the fluid flow path 206 ends at the welding-type tool 108 after going through the welding-type equipment 250.

In the example of FIG. 2, the welding-type equipment 250 connects to the welding-type tool 108 via the fluid flow path 206. As shown, the welding-type equipment 250 also has a separate connection to the welding-type tool 108, such as for routing electrical power, electrical signals, and/or wire, for example. In some examples, both connections of the welding-type equipment 250 to the welding-type tool 108 in FIG. 2 may be implemented via the connection of the cable 124 to the welding-type tool 108 shown in FIG. 1.

In the example of FIG. 2, the welding-type equipment 250 includes equipment control circuitry 252, an equipment user interface (UI) 254, and one or more equipment specific devices 256 interconnected with one another. In some examples, the equipment control circuitry 252 may include memory circuitry and/or processing circuitry. Though not shown for the sake of clarity and simplicity, in some examples, the equipment control circuitry 252 may be in electrical communication with the on/off solenoid valve 204 (e.g., to control the operation of the on/off solenoid valve 204).

In some examples, the equipment UI 254 may comprise user accessible inputs and/or outputs. For example, the equipment UI 254 may comprise one or more visual outputs (e.g., touch display screens, video monitors, light emitting diodes, incandescent lights, and/or other lights, etc.) and/or one or more audio outputs (e.g., audio speakers). In some examples, the equipment UI 254 may further comprise one or more inputs (e.g., touch display screens, buttons, knobs, switches, microphones, etc.). In some examples, the equipment UI 254 may comprise one or more input and/or output ports and/or devices (e.g., USB ports, audio ports, HDMI ports, etc.).

In some examples, the equipment specific device(s) 256 may include devices specific to the particular piece of welding-type equipment 250. For example, where the welding-type equipment 250 is a welding-type power supply 102, the equipment specific device(s) 256 may include power conversion circuitry configured to receive input power, and convert the input power to welding-type output power (e.g., used by the welding-type tool 108). As another example, where the welding-type equipment 250 is a wire feeder 104, the equipment specific device(s) 256 may include a motor and several wire rollers to feed wire to the welding-type tool 108. In some examples, the one or more of the equipment specific devices 256 may be controlled by the equipment control circuitry 252.

In some examples, the welding-type tool 108 may send one or more control signals to the equipment control circuitry 252 (e.g., in response to an activation and/or deactivation of the welding-type tool 108). In some examples, the equipment control circuitry 252 may control the on/off solenoid valve 204 based on the signal(s) received from the welding-type tool 108, such as by energizing/opening the on/off solenoid valve 204 in response to activation (e.g., a trigger pull) of the welding-type tool 108 and de-energizing/closing the on/off solenoid valve 204 in response to deactivation (e.g., trigger release) of the welding-type tool 108. In some examples, the equipment control circuitry 252 may delay closing the on/off solenoid valve 204 following deactivation of the welding-type tool 108 to perform a post flow operation.

However, in either case, there is no way for the equipment control circuitry 252 to control closure of the needle valve 216 as well as the on/off solenoid valve 204. Thus, unless the needle valve 216 (and/or globe valve 134) is closed by hand, fluid will continue to try to flow to the welding-type tool 108 right up until the on/off solenoid 204 is closed. This may result in buildup of fluid pressure behind the on/off solenoid valve 204 and a potential surge of expelled fluid when the on/off solenoid 204 is next opened, which may negatively impact the welding-type operation.

Figure 3:
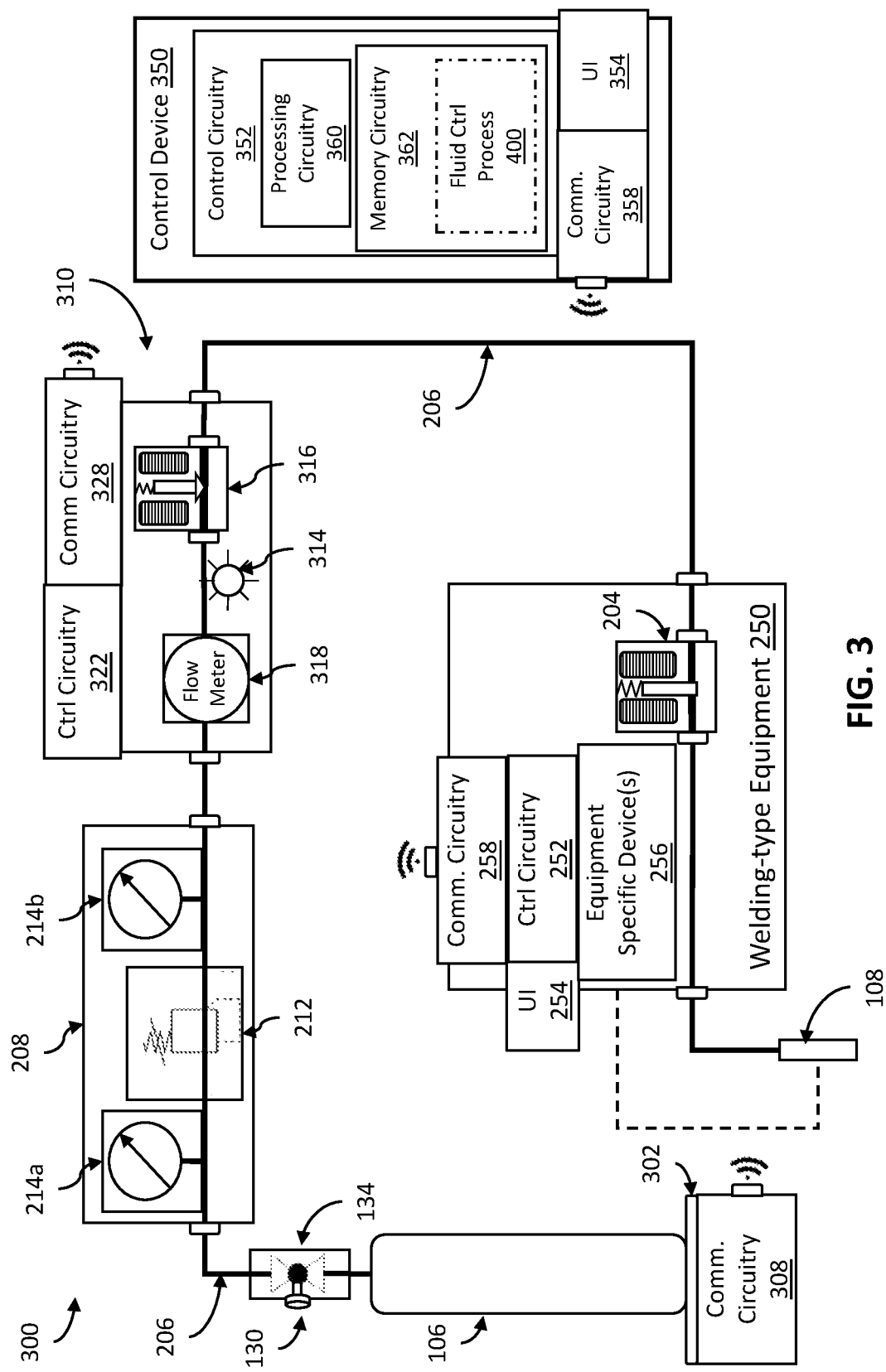
FIG. 3 is a diagram of an example improved fluid supply system that may be used with the welding-type system of FIG. 1, in accordance with aspects of this disclosure.

FIG. 3 is a diagram showing an example improved fluid supply system 300 that may be used with the welding-type system 100 of FIG. 1. As shown, the improved fluid supply system 300 is similar to the fluid supply system 200. For example, the improved fluid supply system 300 also includes the fluid tank 106, the pressure regulator 208, the on/off solenoid valve 204 of the welding-type equipment 250, and the welding-type tool 108 in fluid communication with one another via fluid path 206.

Unlike the fluid supply system 200, the improved fluid supply system 300 depicted in FIG. 3 includes an improved flow regulator 310 instead of the flow regulator 210 of the fluid supply system 200 of FIG. 2. In the example of FIG. 3, the improved flow regulator 310 includes an electric flow meter 318, an energy harvesting device 314, a proportional solenoid valve 316, flow control circuitry 322, and flow communication circuitry 328. As shown, the flow control circuitry 322 and flow communication circuitry 328 are electrically connected to one another. While not shown for the sake of simplicity, in some examples, the flow control circuitry 322 (and/or flow communication circuitry 328) may also be connected to the electric flow meter 318, the energy harvesting device 314, and/or the proportional solenoid valve 316. In some examples, the flow control circuitry 322 may control (e.g., via one or more control signals) the electric flow meter 318, the energy harvesting device 314, the proportional valve 316, and/or the flow communication circuitry 328.

While not shown for the sake of simplicity, in some examples, the improved flow regulator 310 may also include a power source (e.g., a battery). In some examples, the power source may be rechargeable. In some examples, the components of the improved fluid regulator 202 may be powered by the power source. In some examples, the energy harvesting device 314 may harvest (e.g., kinetic) energy from fluid flowing through the fluid path 310 of the flow regulator 210 and convert that energy to electrical energy. For example, the energy harvesting device 314 may be a wheel that is turned, or a piezoelectric device that is vibrated, by the (e.g., kinetic) force of fluid flowing through the improved flow regulator. The captured and converted electrical energy may be used to recharge the power source of the improved flow regulator 310, and/or to directly power one or more components of the improved flow regulator 310. This additional harvested energy may be useful in reducing the size of the power source required for the improved flow regulator 310, thereby also reducing the overall footprint of the improved flow regulator 310.

In the example of FIG. 3, the improved flow regulator 310 includes an electric flow meter 318 rather than the ball float flow meter 218 of the flow regulator 210 of FIG. 2. In some examples, the electric flow meter 318 measures a flow rate of fluid through the fluid flow path 206 of the improved flow regulator 310 (and/or the electric flow meter 318). In some examples, the electric flow meter 318 may include a display screen configured to display the flow rate measurement(s). In some examples, the electric flow meter 318 may send or more signals representative of the flow rate measurement(s) to the flow control circuitry 322. In some examples, the flow control circuitry 322 may control the flow communication circuitry 328 to send one or more signals representative of the flow rate measurement(s) to other components of the improved fluid supply system 300. While shown as being upstream from the proportional valve 316 in the example of FIG. 3, in some examples, the electric flow meter 318 may instead be downstream of the proportional valve 316.

In the example of FIG. 3, the proportional solenoid valve 316 includes a plunger that is spring biased towards a closed position where the plunger completely obstructs fluid flow through the flow path 206 of the proportional valve 316. The proportional valve 316 includes electrical conductor windings configured to move the plunger via electromagnetic force when the windings conduct electrical current. In some examples, the proportional valve 316 is configured to move the plunger to a variety of different steady state positions (and hold the plunger at those position(s)) depending upon the amount of current conducted through the windings. Thus, the proportional valve 316 may restrict fluid flow entirely, not at all, and/or to any degree in between by energizing the proportional valve 316 with the appropriate amount of electrical current. In some examples, the flow control circuitry 322 may control how much electrical current is used to energize the proportional valve 316, and/or otherwise control the degree to which the plunger of the proportional valve 316 restricts fluid flow through the proportional valve 316. In some examples, the proportional valve 316 may be a servo valve, and/or some other electrically controllable valve.

In some examples, the improved flow regulator 310 may receive a target flow rate, and the flow control circuitry 322 may continuously control and/or adjust the proportional valve 316 using feedback from the electric flow meter 318 to achieve the target flow rate. In some examples, the proportional valve 316 may include a UI through which an operator may enter the target flow rate. In some examples, an operator may set the target flow rate via the equipment UI 254 and/or a device UI 354, and the proportional valve 316 may receive the target flow rate via the flow communication circuitry 328. In some examples, the target flow rate may be automatically set based on a selected welding-type process, an operational program, and/or some other parameter.

In the example of FIG. 3, the welding-type equipment 250 of the improved fluid supply system 300 still includes the equipment specific device(s) 256, equipment UI 254, and equipment control circuitry 252, but also includes equipment communication circuitry 258. Though abstracted for the sake of simplicity, in some examples, the equipment specific device(s) 256, equipment UI 254, equipment control circuitry 252, and equipment communication circuitry 258 may be interconnected with one another (e.g., via a common electrical bus). In some examples, the equipment control circuitry 252 may allow the welding-type equipment 250 to send/receive signals to/from the improved flow regulator 310 and/or control device 350 to coordinate and/or control fluid flow through the improved flow regulator 310.

In the example of FIG. 3, the improved fluid supply system 300 shown in FIG. 3 also includes a scale 302 configured to measure a weight of the fluid tank 106. In some examples, the scale 302 may help to determine a remaining amount of fluid in the fluid tank 106. In some examples, determining remaining fluid via weight of the fluid tank 106 may be more accurate than determining via pressure, especially where the fluid is prone to change states at different pressures (e.g., $CO_2$).

In the example of FIG. 3, the scale 302 includes (and/or is connected to) scale communication circuitry 308. In some examples, the scale 302 may communicate with other components of the improved fluid supply system 300 via the scale communication circuitry 308. For example, the scale communication circuitry 308 may transmit one or more signals representative of the measurements of the scale 302 to the rest of the fluid supply system 200 via the scale communication circuitry 308.

In the example of FIG. 3, the improved fluid supply system 300 also includes a control device 350. In some examples, the control device 350 may be a computing device, such as, for example, a remote server, desktop computer, smartphone, laptop, tablet, etc. In some examples, the control device 350 may be implemented via the welding-type equipment 250 or the improved flow regulator 310.

In the example of FIG. 3, the control device 350 has device communication circuitry 358, a device UI 354, and device control circuitry 352 interconnected with one another. In some examples, the device UI 354 may comprise user accessible inputs and/or outputs. For example, the device UI 354 may comprise one or more visual outputs (e.g., touch display screens, video monitors, light emitting diodes, incandescent lights, and/or other lights, etc.) and/or one or more audio outputs (e.g., audio speakers). In some examples, the device UI 354 may further comprise one or more inputs (e.g., touch display screens, buttons, knobs, switches, microphones, etc.). In some examples, the device UI 354 may comprise one or more input and/or output ports and/or devices (e.g., USB ports, audio ports, HDMI ports, etc.).

In some examples, the control device 350 may use the device communication circuitry 358 to communicate with the scale communication circuitry 308, equipment communication circuitry 258, and/or flow communication circuitry 328 of the improved fluid supply system 300. For example, an operator may enter a target flow rate via the device UI 354 (and/or the device control circuitry 352 may determine the target flow rate based on a welding-type process, welding parameters, welding-type tool 108, fluid type, etc. entered via the device UI 354), and the device communication circuitry 358 may transmit this information to the improved flow regulator 310 and/or welding-type equipment 250.

While depicted as communicating wirelessly for the sake of clarity and simplicity, in some examples, the device communication circuitry 358, scale communication circuitry 308, equipment communication circuitry 258, and/or flow communication circuitry 328 may instead communicate over a wired connection. Wired protocols may include, for example, USB, Ethernet, serial, and/or other appropriate wired protocols. Wireless protocols may include, for example, cellular protocols, IEEE 802.11 standard protocols (commonly referred to as WiFi), short wavelength ultra-high frequency protocols (commonly referred to as Bluetooth), IEEE 802.15.4 standard protocols (commonly referred to as Zigbee), near field communication (NFC) protocols, radio frequency identification (RFID) protocols, and/or other appropriate wireless protocols. In some examples, the communication may be through a network (e.g., a Local Access Network, Wide Area Network, the Internet, etc.).

In the example of FIG. 3, the device control circuitry 352 includes device processing circuitry 360 and device memory circuitry 362. In some examples, the device processing circuitry 360 may include one or more processors. As shown, the device memory circuitry 362 includes (and/or stores) a fluid control process 400.

Figure 4:
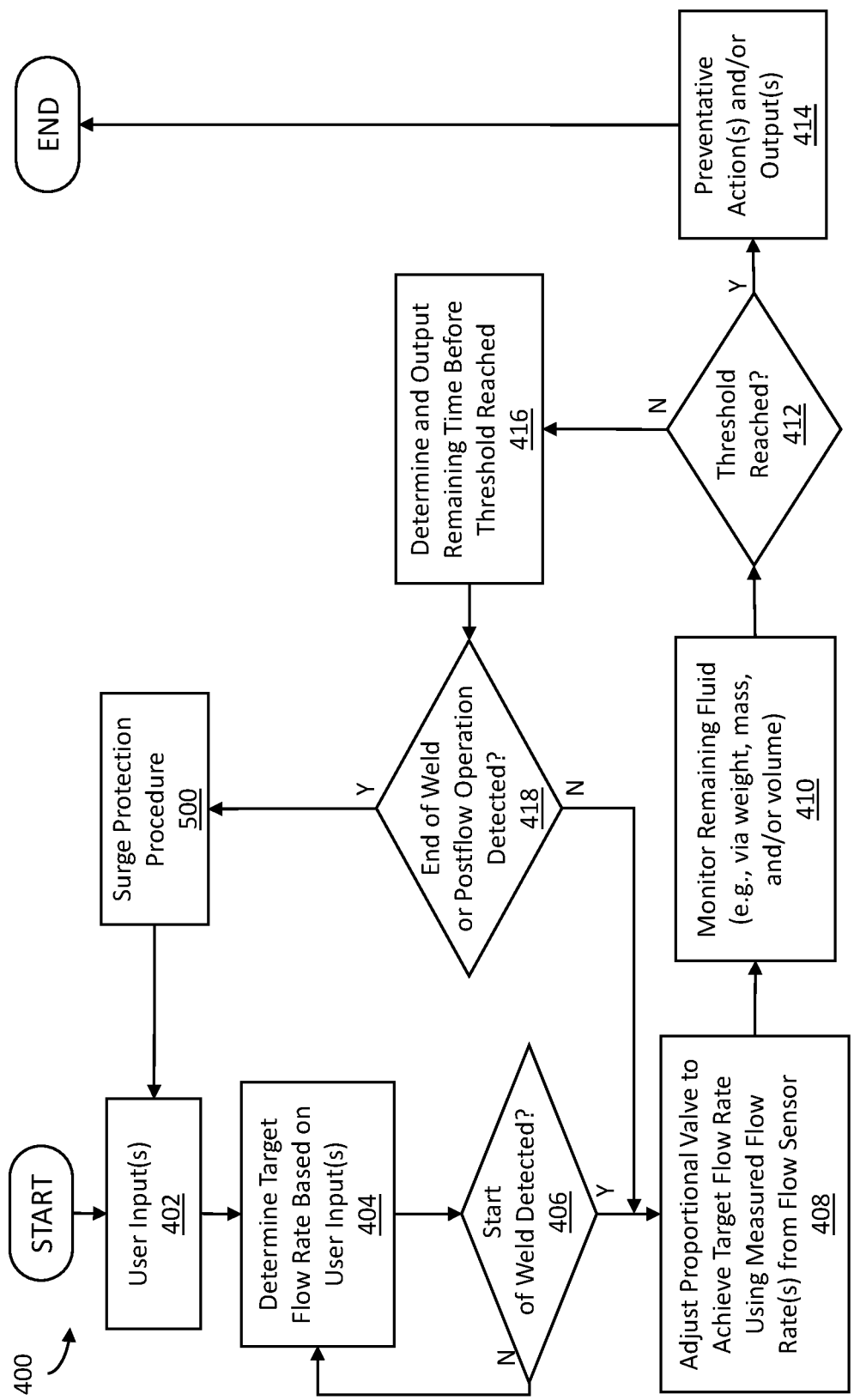
FIG. 4 is a flow diagram illustrating an example fluid control process, in accordance with aspects of this disclosure.

FIG. 4 is a flow diagram illustrating an example operation of the fluid control process 400. While, in the example of FIG. 4, the fluid control process 400 is illustrated as being stored in the device memory circuitry 362, in some examples, the fluid control process 400 may alternatively, or additionally, be implemented via discrete circuitry of the device control circuitry 352. In some examples, the fluid control process 400 may be implemented via machine readable instructions stored in the device memory circuitry 362. While illustrated as a single process in the example of FIG. 4 for the sake of clarity and simplicity, in some examples, portions of the fluid control process 400 may be separately performed and/or executed by the improved flow regulator 310, welding-type equipment 250, and/or control device 350. In some examples, the fluid control process 400 may be executed as part of, or in parallel with, a larger welding-type process.

In the example of FIG. 4, the fluid control process 400 begins at block 402, where the user provides one or more inputs (e.g., via device UI 354). In some examples, the user input(s) may include, for example, a welding-type process (e.g., GMAW, GTAW, FCAW, SMAW, plasma, etc.), welding-type operation (welding, cutting, brazing, etc.), positioning of workpiece 112 (e.g., flat, horizontal, vertical, overhead), type of welding-type tool 108 (e.g., TIG torch, MIG gun, electrode holder, cutting tool, etc.), fluid type (e.g., compressed air, argon, helium, oxygen, carbon dioxide, etc.), size of fluid tank 106 (e.g., height, diameter, weight, volume, pressure when full, etc.), brand of fluid tank 106, an identifier (e.g., serial number) of the fluid tank 106, pressure of fluid tank 106 when full, threshold information, target flow rate, target use time, surge protection delay time, equalizing pressure, and/or other relevant information.

In the example of FIG. 4, the fluid control process 400 proceeds to block 404 after block 402. At block 404, the fluid control process 400 determines a target flow rate of fluid through the fluid path 206 of the improved fluid supply system 300 based the user input(s) received at block 302. For example, the user may directly input a target flow rate, and the fluid control process 400 may determine that this is an appropriate target flow rate (e.g., within some known, stored, and/or previously determined range). As another example, the fluid control process 400 may determine a recommended target flow rate based on other user entered information (e.g., welding-type process, welding-type operation, positioning, tool type, target time, fluid type, fluid tank size, etc.). In some examples, the fluid control process 400 may prompt for (and/or receive) user approval (e.g., via device UI 354) prior to proceeding with a recommended target flow rate.

In the example of FIG. 4, the fluid control process 400 proceeds to block 406 after block 404. At block 406, the fluid control process 400 determines whether welding has begun. In some examples, this may entail determining whether the welding-type tool 108 has been activated. For example, an activation signal may be sent to the equipment control circuitry 252 when the welding-type tool 108 is activated (e.g., from a trigger pull, foot pedal press, etc.). This activation signal may be used to signal the welding-type equipment 250 to begin sending power and/or wire to the welding-type tool 108. The activation signal may also be used to signal the fluid control process 400 to begin supplying fluid to the welding-type tool 108 via the fluid supply system 200. As shown, the fluid control process 400 returns to block 404 if welding has not begun (though, in some examples, the fluid control process 400 may instead return to block 402 or 406).

In the example of FIG. 4, the fluid control process 400 proceeds to block 408 after block 406 if welding has begun. At block 408, the fluid control process 400 opens the on/off solenoid valve 204 of the welding-type equipment 250 and controls the proportional valve 316 of the improved flow regulator 310 to achieve the target flow rate determined at block 404. In some examples, opening the on/off solenoid valve 204 may include controlling the delivery of an appropriate amount of electrical current to the windings of the on/off solenoid valve 204 to open the valve 204. In some examples, controlling the proportional valve 316 may include controlling the delivery of an appropriate amount of electrical current to the windings of the proportional valve 316 to move the plunger to (and/or hold the plunger at) a position that will allow fluid to flow at the target flow rate. In some examples, the target flow rate may be communicated to the improved flow regulator 310 (e.g., via flow communication circuitry 328 and/or device communication circuitry 358), and the flow control circuitry 322 may control the proportional valve 316 to achieve the target flow rate. In some examples, the flow rate measurement(s) of the electric flow meter 318 may be continuously monitored, and the proportional valve 316 controlled accordingly, to achieve the target flow rate at block 408.

In the example of FIG. 4, the fluid control process 400 proceeds to block 410 after block 408. At block 410, the fluid control process 400 determines (and/or estimates) a remaining amount of fluid in the fluid tank 106. In some examples, the remaining amount of fluid may be stored in memory circuitry 362 with a timestamp. In some examples, the fluid control process 400 may determine the remaining amount of fluid (and/or what percentage of the fluid is remaining) based on the pressure(s) measured by the pressure regulator 208 as compared to a pressure of the fluid tank 106 when full and/or empty (e.g., input by the user at block 402). In some examples, the user may input a fluid type, size of the fluid tank 106, identifier of the fluid tank 106, and/or brand of the fluid tank 106, and the fluid control process 400 may determine the pressure, weight, and/or amount of fluid in the fluid tank 106 when full (and/or empty) based on the this information (e.g., via a data base, lookup table, etc.). In some examples, the fluid control process 400 may default to some preset information about the fluid tank 106 if unable to determine from user input.

In some examples, the fluid control process 400 may determine the remaining amount of fluid in the fluid tank 106 based on an amount of fluid used and an amount of fluid in the fluid tank 106 when full (or when the fluid control process 400 began keeping track). For example, the remaining amount of fluid may be equal to the amount of fluid in the tank 106 when full (or when the fluid control process 400 began keeping track) minus the amount of fluid used. In some examples, the fluid control process 400 may use the fluid flow rate(s) measured by the electric flow meter 318 over time (and/or timestamp information) to determine and/or estimate how much fluid has been used since the beginning of the fluid control process 400 (and/or over some given amount of time).

In some examples, the fluid control process 400 may determine and/or estimate how much fluid has been used in terms of volumetric and/or mass flow amounts of fluid. In some examples, the volumetric amount of fluid used may be determined based on one or more integrals of the fluid flow rate(s) over time. In some examples, the mass flow amount of fluid used may be determined based on the volumetric amount, fluid pressure(s) (e.g., measured by the pressure gauge(s) 214), and temperature(s). In some examples, the improved gas supply system 300 may include a temperature sensor (e.g., in the improved flow regulator 310) configured to measure the temperature of the fluid in the fluid path 206.

In some examples, the fluid control process 400 may determine the remaining amount of fluid in the fluid tank 106 based on a weight of the fluid tank 106. For example, the scale 302 may continuously or periodically communicate (e.g., via scale communication circuitry 308) the weight of the fluid tank 106 to the control device 350, and the fluid control process 400 may compare the weight of the fluid tank 106 at that time to the weight of the fluid tank 106 when full and/or empty (or when the current operation began). In some examples, the weight of the fluid tank 106 when full/empty may be predetermined, input by the user (e.g., at block 402), and/or automatically determined based on other information (e.g., fluid type, size of the fluid tank 106, identifier of the fluid tank 106, brand of the fluid tank 106, etc.) In some examples, the weight of the fluid tank 106 may be considered an accurate and/or precise method of measuring remaining fluid, as it is not impacted by potential changes in state (e.g., liquid v. gaseous) of certain fluid types (e.g., $CO_2$).

In the example of FIG. 4, the fluid control process 400 proceeds to block 412 after block 410. At block 412, the fluid control process 400 determines whether the remaining amount of fluid in the fluid tank 106 determined at block 410 is below a threshold level. In some examples, the threshold level may be stored in device memory circuitry 362. In some examples, the threshold level may be input by the user at block 402 and/or automatically determined based on information input by the user at block 402. In some examples, the threshold level may be set at a default level (e.g., 10% left) if no threshold is input by the user.

In the example of FIG. 4, the fluid control process 400 proceeds to block 414 after block 412 if the fluid control process 400 determines that the threshold level has been reached at block 412. At block 414, the fluid control process 400 takes one or more preventative actions and/or generates one or more outputs to prevent the below threshold fluid level from negatively impacting a welding-type operation. For example, the fluid control process 400 may shut down and/or disable welding-type equipment 250 to prevent the below threshold fluid level from negatively impacting a welding-type operation. As another example, the fluid control process 400 may output a prominent and/or emphasized alert, notification, and/or warning on the equipment UI 254 of the welding-type equipment 250, the device UI 354, and/or a UI of the improved flow regulator 310. In some examples, the alert, notification, and/or warning may be output via a communication (e.g., via email, text message, and/or or app) to an operator, owner, purchasing manager, and/or welding supply distributor. As another example, the fluid control process 300 may open a website or service where more fluid can be ordered, output a link to a website or service where more fluid can be ordered, or automatically reorder more fluid.

In the example of FIG. 4, the fluid control process 400 ends after block 414. However, in some examples, the fluid control process 400 may instead proceed to block 416 after 414, instead of ending. As shown, the fluid control process 300 also proceeds to block 416 after block 412 if the remaining amount of fluid determined at block 412 is above the threshold level.

At block 416, the fluid control process 400 determines a remaining time until the fluid tank 106 reaches the threshold level. In some examples, the remaining time may be a positive or negative value (e.g., to account for situations where the threshold has been surpassed). In examples where block 416 executes after block 414, and the threshold amount of remaining fluid used at block 412 is greater than zero, the fluid control process 400 may use zero as the threshold at block 416.

In some examples, the determination of remaining time may be based on the remaining fluid amount determined at block 410 and an estimated fluid use rate. In some examples, the estimated fluid use rate may be determined using an existing fluid flow rate (e.g., measured by the electric flow meter 318) and/or an average fluid flow rate. In some examples, the average fluid flow rate may be estimated using past timestamped fluid flow rates and/or remaining fluid levels. In some examples, the average fluid flow rate may be determined based on average fluid flow rates for similar welding-type processes, welding-type operations, tool types, fluid types, brands of fluid tanks 106, positioning of workpieces 112, etc. For example, the device memory circuitry 362 may have a database, lookup table, and/or other data correlations in device memory circuitry 362 that allow for this information to be accessed.

In some examples, the fluid control process 400 may also provide an output based on the remaining fluid and/or times determined at blocks 416 and 410. In some examples, the remaining fluid may be output in the form of a graphic, video, audio, text, numeric, and/or percentage (e.g., of total possible and/or beginning fluid). In some examples, the output may be a communication (e.g., via email, text message, and/or app) to an operator, owner, purchasing manager, and/or welding supply distributor.

In the example of FIG. 4, the fluid control process 400 proceeds to block 418 after block 416. At block 418, the fluid control process 400 determines whether the welding operation that was begun at block 406 has ended, and/or a post flow operation following the end of the welding operation has ended. In some examples, this may entail determining whether the welding-type tool 108 has been deactivated. For example, the activation signal sent to the equipment control circuitry 252 when the welding-type tool 108 is activated (e.g., from a trigger pull, foot pedal press, etc.) may be absent when the welding-type tool 108 has been deactivated (or a separate deactivation signal may be sent). In some examples, and/or for some welding processes, a post flow operation may execute following deactivation of the welding-type tool 108. In the post flow operation, fluid may continue to flow for a predetermined amount of time after deactivation (e.g., to help purge the fluid flow path 206). As shown, the fluid control process 400 returns to block 408 after block 418 if the welding operation or post flow operation has not ended.

In the example of FIG. 4, the fluid control process 400 proceeds to block 500 after block 418 if the fluid control process 400 detects that the welding operation and/or the post flow operation has ended. At block 500, the fluid control process 400 executes a surge prevention process 500. The surge prevention process 500 is explained in further detail below with respect to FIG. 5. As shown, the fluid control process 400 returns to block 402 after the surge prevention process 500 (though, in some examples, the fluid control process 400 may instead return to block 404 or end).

Figure 5:
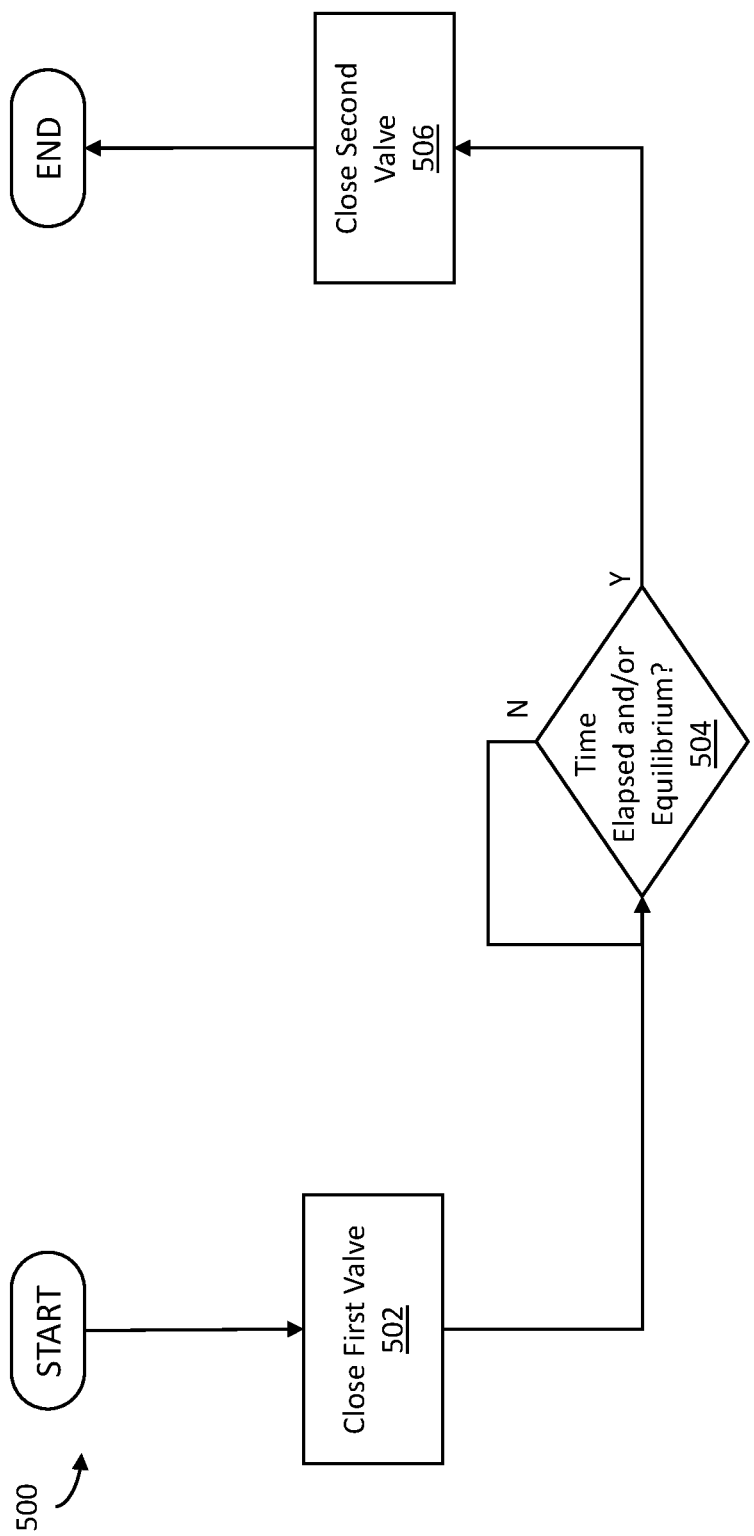
FIG. 5 is a flow diagram illustrating an example surge prevention process, in accordance with aspects of this disclosure.

FIG. 5 is a flowchart showing an example surge prevention process 500. As shown, the surge prevention process 500 begins at block 502, where the surge prevention process 500 completely closes the proportional valve 316 of the improved flow regulator 310. In some examples, this may include cutting off electrical current to the windings of the proportional valve 316, so that the spring biases the plunger to a completely closed position that will allow no fluid to flow through the proportional valve 316. In some examples, one or more signals representative of a close command and/or a target flow rate of zero may be communicated to the improved flow regulator 310 (e.g., via flow communication circuitry 328 and/or device communication circuitry 358), and the flow control circuitry 322 may close the proportional valve 316 in response to receiving the signal(s).

In the example of FIG. 5, the surge prevention process 500 proceeds to block 504 after block 502. At block 504, the surge prevention process 500 determines whether a certain amount of time has elapsed since the proportional valve 316 was closed at block 504. In some examples, the surge prevention process 500 may additionally, or alternatively, determine at block 504 whether a pressure in the fluid flow path 206 between the proportional valve 316 and on/off solenoid valve 204 has reached equilibrium with an ambient pressure of the outside environment. In some examples, the amount of time may be predetermined, stored in device memory circuitry 362, and/or entered by the user at block 402. In some examples, the delay at block 504 may allow time for the pressure in the fluid flow path 206 to equalize.

In some examples, the improved fluid supply system 300 may include one or more pressure measurement devices configured to measure the pressure in the fluid flow path 206 between the on/off solenoid valve 204 and the proportional valve 316. In some examples, the improved fluid supply system 300 may also include one or more pressure measurement devices configured to measure the pressure of the ambient environment. In some examples, the pressure measurement device(s) may communicate the pressure measurement(s) to the control device 350 in order to help make the determination at block 504.

In the example of FIG. 5, the surge prevention process 500 returns to block 504 if the correct amount of time has not elapsed, and/or the pressure in the fluid flow path 206 has not equalized. As shown, the surge prevention process 500 proceeds to block 506 after block 504 if the correct amount of time has elapsed, and/or the pressure in the fluid flow path 206 has equalized. At block 506, the surge prevention process 500 closes the on/off solenoid valve 204 of the welding-type equipment 250. In some examples, closing the on/off solenoid valve 204 may include cutting off electrical current to the windings of the on/off solenoid valve 204 to close the valve 204. As shown, the surge prevention process 500 ends after block 506.

The ability of the example proportional valve 316 to be electrically controlled allows the improved fluid supply system 300 to prevent a surge of pressurized fluid at the end of a welding-type operation by coordinate closure of the proportional valve 316 and on/off solenoid valve 204. More particularly, being able to automatically close the proportional valve 316 and then delay closure of the on/off solenoid valve 204 allows pressure in the fluid flow path 206 to reach equilibrium with an ambient pressure after a welding operation (and/or a post flow operation) has ended. This, in turn, ensures that there is no pressure buildup and/or associated surge of pressurized fluid when the on/off solenoid valve 204 is next opened (e.g., at the start of the next welding operation); all without the need for the operator to manually intervene.

In some examples, a second on/off solenoid valve may be used instead of the proportional valve 316. For example, a second on/off solenoid valve may be positioned at the same place as the proportional valve 316 (or farther upstream), and a traditional needle valve 216 may instead be used to regulate fluid flow rate. Such an example may cut down on cost by removing the proportional valve 316 while still implementing the surge prevention process 500; though it may also be less robust than the improved fluid supply system 300 shown in FIG. 3.

The present methods and systems may be realized in hardware, software, and/or a combination of hardware and software. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As used herein, the terms "approximate" and/or "approximately," when used to modify or describe a value (or range of values), position, shape, orientation, and/or action, mean reasonably close to that value, range of values, position, shape, orientation, and/or action. Thus, the examples described herein are not limited to only the recited values, ranges of values, positions, shapes, orientations, and/or actions but rather should include reasonably workable deviations.

As utilized herein, the terms "e.g.," and "for example" set off lists of one or more non-limiting examples, instances, or illustrations.

As used herein, the terms "couple," "coupled," "attach," "attached," "connect," and/or "connected" refer to a structural and/or electrical affixing, joining, fasten, linking, and/or other securing.

As utilized herein the terms "circuits" and "circuitry" refer to physical electronic components (i.e. hardware) and/or any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code.

As utilized herein, circuitry is "configured" to perform a function whenever the circuitry comprises the necessary hardware and code (if any is necessary) to perform the function, regardless of whether performance of the function is disabled or not enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, welding-type power refers to power suitable for welding, cladding, brazing, plasma cutting, induction heating, CAC-A and/or hot wire welding/preheating (including laser welding and laser cladding), carbon arc cutting or gouging, and/or resistive preheating.

As used herein, a welding-type power supply and/or power source refers to any device capable of, when power is applied thereto, supplying welding, cladding, brazing, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

As used herein, a welding-type tool refers to any tool capable of performing a welding, cladding, brazing, plasma cutting, induction heating, carbon arc cutting or gouging and/or resistive preheating operation.

Disabling of circuitry, actuators, and/or other hardware may be done via hardware, software (including firmware), or a combination of hardware and software, and may include physical disconnection, de-energization, and/or a software control that restricts commands from being implemented to activate the circuitry, actuators, and/or other hardware. Similarly, enabling of circuitry, actuators, and/or other hardware may be done via hardware, software (including firmware), or a combination of hardware and software, using the same mechanisms used for disabling.

While the present method and/or system has been described with reference to certain implementations, it will be understood by those skilled in the art that various changes may be made and equivalents may be substituted without departing from the scope of the present method and/or system. For example, blocks and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type system, comprising:
a first valve;
a second valve; and
control circuitry configured to:
receive a flow path pressure measurement of a flow path pressure in a flow path between the first valve and the second valve,
receive an ambient environment pressure measurement of an ambient environment pressure,
determine whether a threshold pressure differential between the flow path pressure and the ambient environment pressure has been reached based on the flow path pressure measurement and the ambient environment pressure measurement,
close the first valve via a first control signal, and
after closing the first valve, close the second valve via a second control signal in response to determining the threshold pressure differential has been reached.

2. The system of claim 1, wherein the first valve is in fluid communication with a fluid reservoir.

3. The system of claim 1, wherein the second valve is in fluid communication with a welding tool.

4. The system of claim 3, wherein the second valve is further in fluid communication with the first valve.

5. The system of claim 1, wherein the first valve is a proportional valve.

6. The system of claim 1, wherein the second valve is an on or off solenoid valve.

7. The system of claim 1, wherein the second valve is in a welding-type power supply, a wire feeder, or the welding tool.

8. The system of claim 1, wherein the control circuitry is configured to close the first valve via the first control signal in response to detecting an end of a weld, or detecting an end of a postflow operation following the end of the weld.

9. The system of claim 1, wherein the control circuitry is configured to determine whether the threshold pressure differential has been reached after closing the first valve.

10. The system of claim 1, wherein the threshold pressure differential is a zero pressure differential.

11. A method, comprising:
receiving, at control circuitry, a flow path pressure measurement of a flow path pressure in a flow path between a first valve and a second valve;
receiving, at the control circuitry, an ambient environment pressure measurement of an ambient environment pressure;
determining, via the control circuitry, whether a threshold pressure differential between the flow path pressure and the ambient environment pressure has been reached based on the flow path pressure measurement and the ambient environment pressure measurement;
closing the first valve via a first control signal sent by the control circuitry; and
after closing the first valve, closing the second valve via a second control signal sent by the control circuitry in response to determining the threshold pressure differential has been reached.

12. The method of claim 11, wherein the first valve is in fluid communication with a fluid reservoir.

13. The method of claim 11, wherein the second valve is in fluid communication with a welding tool.

14. The method of claim 13, wherein the second valve is further in fluid communication with the first valve.

15. The method of claim 11, wherein the first valve is a proportional valve.

16. The method of claim 11, wherein the second valve is an on or off solenoid valve.

17. The method of claim 11, wherein the second valve is in a welding-type power supply, a wire feeder, or the welding tool.

18. The method of claim 11, wherein the first valve is closed in response to the control circuitry detecting an end of a weld, or detecting an end of a postflow operation following the end of the weld.

19. The method of claim 11, wherein the determination of whether a threshold pressure differential has been reached is made after closing the first valve.

20. The method of claim 11, wherein the threshold pressure differential is a zero pressure differential.

* * * * *